Dec. 17, 1940.   P. D. MERRILL   2,224,918
PIPE LEAK SEALING PLUG
Filed June 2, 1939
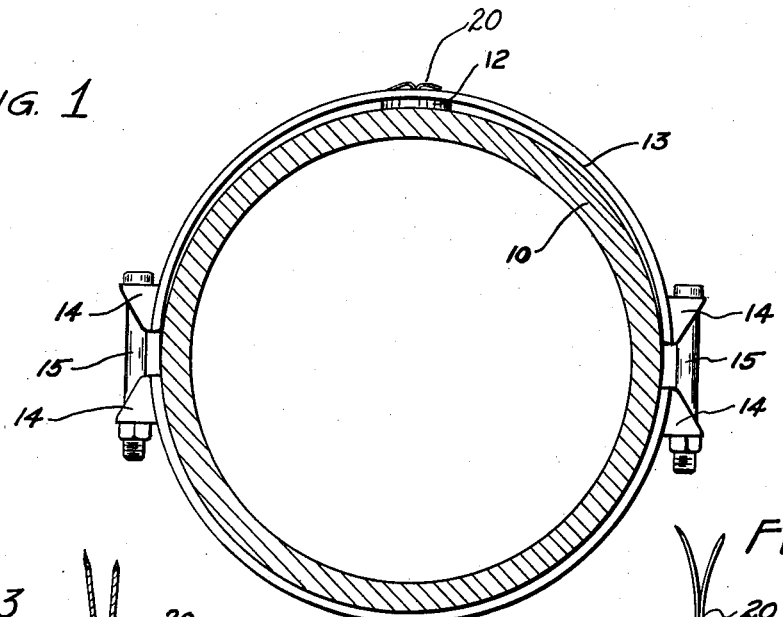
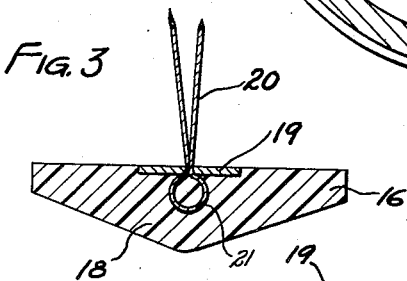
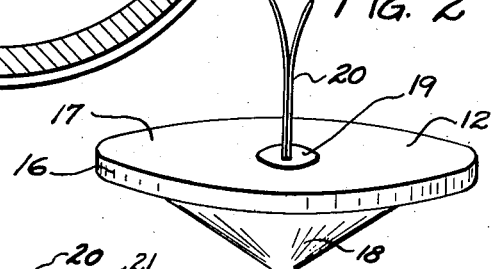
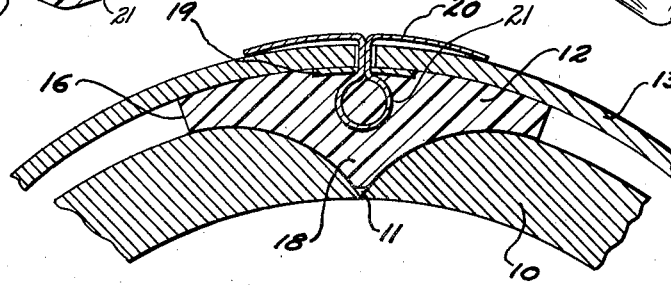
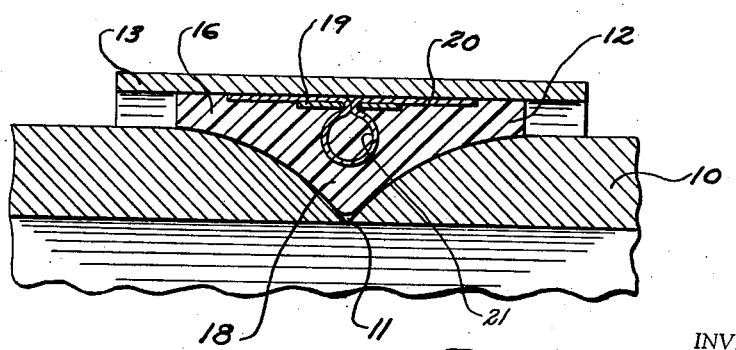
INVENTOR.
PATTERSON D. MERRILL.
BY Oltsch & Knoblock
ATTORNEYS.

Patented Dec. 17, 1940

2,224,918

UNITED STATES PATENT OFFICE 2,224,918

PIPE LEAK SEALING PLUG

Patterson D. Merrill, South Bend, Ind., assignor to M. B. Skinner Company, South Bend, Ind., a corporation of Indiana Application June 2, 1939, Serial No. 276,966

2 Claims. (Cl. 138—99)

This invention relates to pipe leak sealing plugs of the cone plug type adapted to be applied to a pitted leaking area of a pipe and to be pressed thereagainst by a pipe. The plug is of the same general type illustrated in my Patent No. 2,077,050, dated April 13, 1937.

By reason of the fact that fluid under high pressure may be exhausted at the pipe leak to be sealed by the plug, it is difficult to apply a plug and clamp to the leak and to hold the same in operative relation to the leak during the time the plug and clamp are being applied. Consequently, means for attaching the plug to the clamp to hold the same together for handling, manipulation and application as a unit, is desirable. Also, for convenience, it is desirable that such means be operable and applicable by hand and without the use of tools. At the same time, it is desirable in emergencies, and where clamps provided for cooperation with the attaching means are not available, to use any available conventional clamp without interference from the attaching means on the plug. It is, therefore, the primary object of this invention to provide a pipe leak sealing plug having the above defined properties and advantages.

A further object is to provide a plug with attaching means extending through an aperture in a clamp and with means preventing extrusion of the plug material through said clamp aperture under pressure.

A further object is to provide a pipe leak plug with a member having its head imbedded in the plug and its exteriorly extending attachment parts readily bendable by the fingers.

Other objects will be apparent from the description and appended claims.

In the drawing:

Fig. 1 is a cross sectional view of a pipe having my improved leak plug applied thereto by a clamp.

Fig. 2 is a perspective view of the leak plug.

Fig. 3 is a sectional view of the leak plug.

Fig. 4 is an enlarged fragmentary sectional view illustrating one method of using the plug.

Fig. 5 is an enlarged cross sectional view illustrating another method of using the plug.

Referring to the drawing which illustrates the preferred embodiment of the invention, the numeral 10 designates a pipe having a pitted leaking portion 11. At said leaking portion I apply my leak plug 12 by means of a clamp. As here illustrated the clamp comprises a pair of arcuately bent rigid bands 13 having reinforced outwardly bent flanged ends 14, with the adjacent ends of bands 13 interconnected by bolts 15 which draw the clamp tight to press against the plug.

The plug 12 is preferably formed of rubber and its shape is defined by a narrow cylindrical portion 16 having a flat face 17 at one end and a substantially conical projecting portion 18 at its opposite end for seating in the pitted leaking pipe portion.

I provide the plug so defined with attaching means comprising an elongated strip of metal such as brass or steel, bent to provide a pair of arms or prongs 20 and an intermediate loop or head 21. Loop 21 is imbedded in the plug centrally thereof, with arms 20 projecting perpendicularly from face 17 of the plug. A metal plate 19 having an aperture centrally therein through which arms 20 extend with a tight fit is preferably imbedded in the plug with its outer surface substantially flush with plug face 17.

The plug is primarily intended for use with a clamp having an aperture therein through which arms 20 may pass. The arms 20 are formed of metal sufficiently thin to permit them to be bent by hand against the outer face of the clamp, as illustrated in Fig. 4, thereby securing the plug in operative relation to the clamp for unitary application of clamp and plug to the pipe. It will be observed that the application of pressure to the plug by the clamp is not retarded by the attaching means. Also the application of pressure to the plug cannot produce extrusion of the rubber of the plug through the clamp aperture receiving arms 20 by reason of the position of plate 19 spanning said aperture. Another function served by plate 19 is that of a lock for the loop 21 of the attaching member. Thus it will be seen that if the projecting arms 20 should be struck, pulled upon or otherwise subjected to stresses tending to dislocate or pull out the attachment member from the plug, this stress is taken up by the plate 19 against which the loop 21 bears. When the plug is operatively attached to the clamp, the plate 19 serves to transmit such stress against the clamp. Hence the construction has the advantage of great strength and secure anchoring of the attachment member with respect to the plug.

Another advantage of the construction is that the plug may be used with an unapertured clamp, without the attachment of plug and clamp, as illustrated in Fig. 5. The arms 20 may be bent flat against face 17 of the plug, in which event the arms, being thin and flat, do not interfere with solid seating of the clamp against the plug. In fact, the exertion of pressure on the plug by the clamp will be sufficient under normal conditions to press the arms 20 into the body of the plug and substantially flush with face 17 of the plug.

I claim:

1. A pipe leak sealing plug comprising a body of resilient material, a metal clip having a head imbedded in said body and elongated prongs projecting from the body in substantially face contacting engagement, and a plate carried by said body and having an aperture through which said prongs extend snugly, said plate bearing on said head.

2. A pipe leak sealing plug as defined in claim 1, wherein said plate is imbedded in said body at the face from which said prongs project.

PATTERSON D. MERRILL.